United States Patent [19]

Davis et al.

[11] 4,415,605

[45] Nov. 15, 1983

[54] SCINTILLATOR SCREEN METHOD OF MANUFACTURE

[75] Inventors: Vincent L. Davis, Milwaukee; Raymond J. D. Smith, Pewaukee, both of Wis.

[73] Assignee: General Electric Company, Milwaukee, Wis.

[21] Appl. No.: 200,408

[22] Filed: Oct. 24, 1980

[51] Int. Cl.³ .............................................. G01J 1/58
[52] U.S. Cl. ........................................ 427/65; 427/70
[58] Field of Search ................................... 427/65, 70

[56] References Cited

U.S. PATENT DOCUMENTS 3,769,059 10/1973 Driard et al. ..................... 117/33.5
4,011,454 3/1977 Lubowski et al. ................ 427/65 X
4,069,355 1/1978 Lubowski et al. .................... 427/70

OTHER PUBLICATIONS

A. L. N. Stevels, et al. "Vapour Deposited CsI:Na Layers, I. Morphologic and Crystallographic Properties," Philips Res. Repts 29, 340–352, 1974.
A. L. N. Stevels, et al. "Vapour-Deposited CsI:Na Layers, II. Screens for Application in X-Ray Imaging Devices", Philips Res. Repts. 29, 353–362, 1974.
Washida, et al., Toshiba Corp., "High Resolutional Phosphor Screen for X-Ray Image Intensifier" Seventh Symposium on Photo-Electronic Image Devices Sep. 4–8, 1978.

Primary Examiner—James R. Hoffman
Attorney, Agent, or Firm—Dana F. Bigelow; Douglas E. Stoner

[57] ABSTRACT

A phosphor screen is produced by a vacuum deposition process using a planetary structure for simultaneously rotating and revolving structured substrates within a chamber. A thermal radiation shield is provided at the central axis and, because of the offset positions of the substrates, the deposited phosphor layers are formed with thicker edges than centers to thereby inherently exhibit uniformity correction characteristics. The process allows for single-layer depositions of relatively great thicknesses which, when annealed for relatively short periods of time, are comprised primarily of columnar fibers aligned normally to the substrate to inhibit lateral scattering of generated light within the screen.

37 Claims, 7 Drawing Figures

PATENT DOCKET # 15-XR-1772

SURFACE OF A TYPICAL
STANDARD CsI SCREEN
@ 100 X

CROSS-SECTION OF A
TYPICAL STANDARD
CsI SCREEN @ 500X

PATENT DOCKET # 15-XR-1772

SURFACE OF A STRUCTURES CsI SCREEN EVAPORATED ON AN ALUMINUM SUBSTRATE PHOTO ETCHED

CROSS-SECTION OF A STRUCTURED CsI SCREEN EVAPORATED ON AN ALUMINUM SUBSTRATE PHOTO ETCHED

SCINTILLATOR SCREEN METHOD OF MANUFACTURE

BACKGROUND OF THE INVENTION

This invention relates generally to scintillator screens for converting radiation to visible light and, more particularly, to phosphor input layers or X-ray image intensifier tubes.

As part of a diagnostic imaging system, an image intensifier tube is used to convert the incident X-ray information to a visible light image of increased brightness. Such an image intensifier tube typically includes at its input end, a faceplate, a phosphor layer or screen for absorbing the incident X-ray photons and for emitting light photons, and a photocathode or photo-emitting layer which absorbs the light photons from the phosphor and emits photoelectrons. The tube acts to accelerate and focus these photoelectrons to form an intensified or brightened image on the output screen of the tube. The brightened image is then processed with conventional means to obtain display on a monitoring screen.

One of the factors which affects the quality of the final image is the thickness of the fluorescent screen. Generally, it is desirable to have the phosphor coating thick enough to absorb all of the X-rays and to thereby avoid excessive electron penetration or "crutch through" of the phosphor that causes excessive noise; however, as the phosphor layer is made thicker, both the resolution and the contrast are decreased because of a phenomena known as "lateral spreading." So, a trade off must be made to have the X-ray screen thick enough to absorb all of the X-ray quanta but, on the other hand, thin enough in order to give a well-resolved image.

In addition to the thickness consideration, the lateral spreading phenomena may also be affected by changes in the processes by which the screens are made. And, therefore, changes in the actual structure of the scintillator screens. In the development of this technology, it has been found that vapor deposition techniques result in higher packing density of phosphor material than could be realized by the conventional tarter preparation procedures. A preferred material for this vapor deposition technique has been cesium iodide or, more specifically, CsI:Na. Moreover, the resolution of a vapor-deposited screen can be improved by suppression of lateral scattering of generated light. Recent development in this field has brought about the use of structured substrates, such as selectively etched metal sheets or wire gauzes or the like for producing regular crack patterns perpendicular to the surface so as to act as light barriers. Screens having the largest number of light barriers of this type are expected to produce the best resolution. The next step in this process has been to anneal the deposit layer to eliminate the electron traps which may exist and which cut down on the light output of the screen. Typical annealing cycles for conventional screens are from one-half to several hours at a temperature range of 200° C. In addition to the desirable elimination of electron traps, this process tends to cause a re-crystallization of the individual phosphor fibers. Because of their close proximity to one another, the fibers have a tendency to fuse together, and, when this occurs, tube resolution suffers. Typically, a screen is formed by alternately depositing layers and annealing layers to form multiple and serial depositions which finally extend to the desired thickness.

In the normal process of vapor deposition, the source is located directly under the substrate on which it is deposited. As the phosphor vapor rises to the substrate, it first contacts the central portion thereof and then flows to the peripheral portions thereof. Accordingly, the resulting deposit layer of phosphor tends to be thicker in the central region than at the edges of the screen. Such a screen with thinner edges is undesirable because it tends to enhance the inherent loss of image brightness which exists at the edge of a screen due to the nature of the tube electron-optic designs. Thus, instead of having thinner edges on the screens, it would be preferable to have thicker edges to offset this phenomena.

In view of the problems and deficiencies discussed hereinabove, it is therefore an object of the present invention to provide an improved scintillator screen and method of making such a screen.

Another object of the present invention is a provision for fabricating a scintillator screen having improved quantum-detection efficiency (QDE) characteristics.

Still another object of the present invention is the provision for fabricating a scintillator screen which is substantially comprised of a plurality of columnar elements extending substantially perpendicularly from a substrate.

Still another object of the present invention is the provision for fabricating a scintillator screen with minimal re-crystallization caused by annealing.

Yet another object of the present invention is the provision for a scintillator screen having a single layer of phosphor material deposited at a sufficient thickness to provide relatively high quantum-detection efficiency characteristics.

Still another object of the present invention is the provision for a scintillator screen structure having a greater thickness at its edges than in its center.

These objects and other features and advantages become more readily apparent on reference to the following description when taken in conjunction with the appended drawings.

SUMMARY OF THE INVENTION

Briefly, in accordance with one aspect of the invention, a plurality of structured substrates are installed in a planetary arrangement within a vacuum deposition apparatus. The individual substrates are therefore offset from the center line of the apparatus and are rotated such that points on their edges move continuously between a position near the center line of the apparatus in a peripheral position substantially offset therefrom. The source is located directly below and on the center line of the planetary apparatus. However, a thermal-radiation shield is placed over the source so as to be disposed directly between the source and the substrates and allows the phosphor vapor to pass only through a central aperture along the axis of the apparatus. In this way, the rotating substrates are allowed to remain at a relatively low temperature during the deposition process. Further, because of the offset positions of the substrates with respect to the glowing vapor, the phosphor layer, which is deposited on the substrate, is thicker at the edges than in the center portion thereof. The thickness in the perimeter is maintained by the revolving and rotating movement of the substrate within the planetary system.

By another aspect of the invention, the source of the evaporator has a relatively high capacity in terms of heat and phosphor, and the phosphor is evaporated at a relatively low rate for relatively long periods of time to obtain a single-layer deposition of substantial size and thickness. Such a single layer presents fewer discontinuities in the perpendiculary-extending column of fibers to thereby result in higher quantum-detection efficiency.

By yet another aspect of the invention, the phosphor screen is annealed for a relatively short period of time and then allowed to cool. Because of the differences in the rates of expansion and contraction of the substrate and that of the evaporated film, the screen is caused to further crack in the structured format of the substrate. These cracks which are generally perpendicular to the substrate surface act as light barriers to suppress the lateral scattering of generated light to thereby increase the quantum-detection efficiency of the screen. Because of the relatively short time period that the screens are heated during the anneal cycle, minimal re-crystallization within the screen occurs to thereby maintain integrity of the individual fibers of the screen.

In the drawings as hereinafter described, a further embodiment is depicted; however, various other modifications and alternative constructions can be made thereto without departing from the true spirit and scope of the invention.

DESCRIPTION OF THE PREFERRED EMBODIMENT

Figure 1:
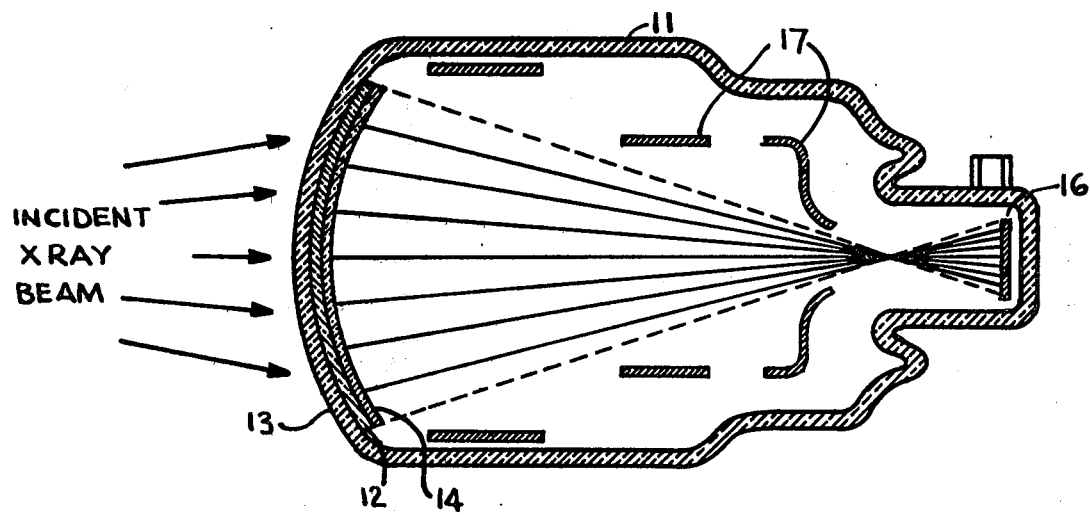
FIG. 1 is a schematic cross-sectional view of an image intensifier tube for which the scintillator screen of the present invention is applicable.

A typical image-intensifier tube for converting incident X-ray information to a visible light image of increased brightness is shown in FIG. 1 and comprises an evacuated glass bulb 11 having an input screen 12 applied to its faceplate 13, a photocathode 14 deposited on the inner side of the input screen 12, and an output screen 16 deposited on the output end of the glass bulb 11. The input screen 12 is comprised of a phosphor or fluorescent material, such as cesium iodide, and supplied in a layer having a thickness in the range of 5 to 12 mils. The photocathode 14 is comprised of a photo-emitting material which is deposited in a thickness of approximately 100 angstroms. The output screen 16 is similar to the input screen in that it is comprised of a phosphor material; however, it is generally planar in shape rather than arcuate as is the input screen.

In operation, the incident X-ray photons penetrate the glass faceplate and are absorbed by the input screen 12 which responsively emits light in proportion to the intensity of the X-ray beams across its surface. The emitted light is absorbed by the photocathode which in turn emits electrons in the direction of the output screen 16. An electrical potential of 25 to 30 kilovolts across the tube acts to accelerate the flow of the electrons, and a plurality of electron lenses 17 disposed within the glass bulb 11 act to direct and focus those electrons selectively to the input screen so that, when the electron beams impinge on the fluorescent coating of the output screen 16, light is emitted in proportion to the flux density of the incident electrons to thereby present an image substantially identical to, but brighter than, the image on the input screen 12.

It is well known that as the input screen absorbs a greater percentage of the entering X-rays, the signal-to-noise ratio of the image increases. However, because of the lateral movement of light photons within the phosphor layer, as discussed hereinabove, both resolution and contrast of the image tend to degrade as the phosphor screen increases in thickness. The present invention is designed to provide a scintillator screen structure with improved resolution and contrast characteristic, while at the same time maintaining a sufficient thickness for a high signal-to-noise ratio. This is accomplished by a vacuum deposition process which results in a single, substantially thick layer of the scintillator phosphor wherein the structure is made up substantially of columnar fibers aligned normally to the substrate to thereby significantly limit the lateral travel of light photons within the structure and thereby result in a quantum detection efficiency in the range of 60–70 percent.

Figure 2:
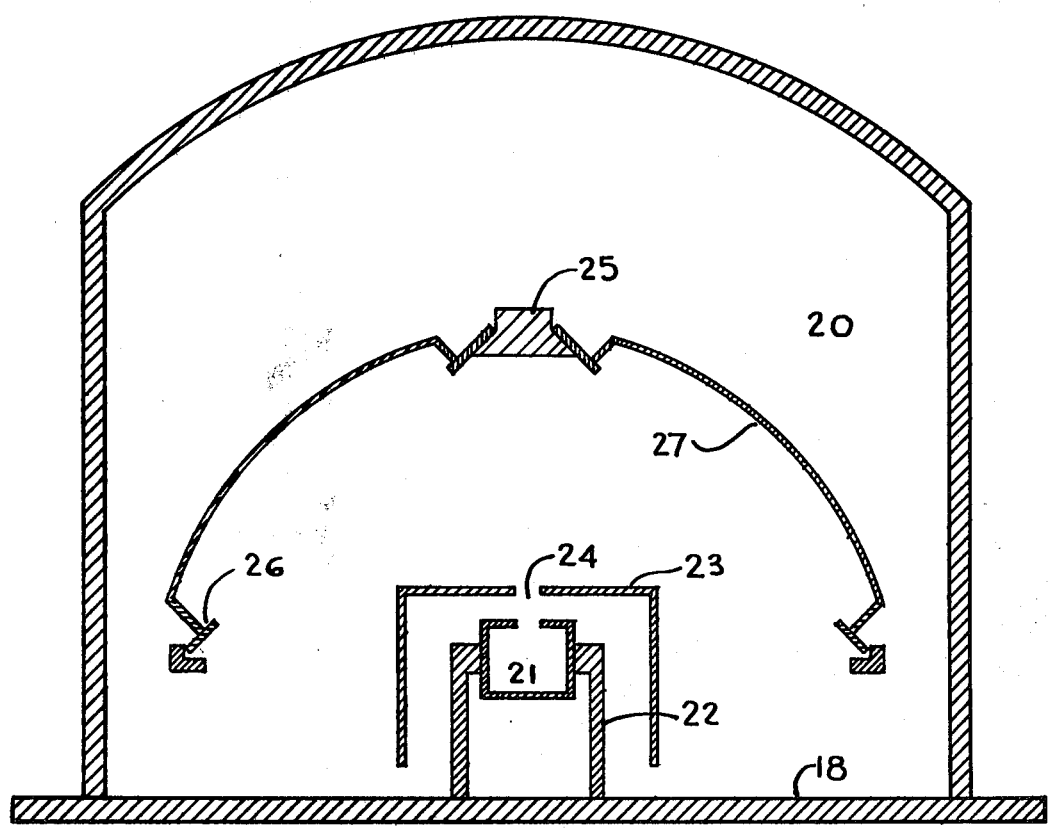
FIG. 2 is a schematic illustration of a vapor-deposition apparatus in accordance with the present invention.

The apparatus which is employed to produce the scintillator screen structure of the present invention is shown in FIG. 2. The outer structure comprises a base plate 18 and an overlying bell jar 19, the purpose of which is to place the system under a vacuum in a manner similar to that of the conventional vacuum deposition apparatus. Within the envelope, and in a vacuum environment represented by the numeral 20, there exists a source of powdered cesium iodide 21 which is heated by conventional means, such as by a heating coil from bus bars 22. As the cesium iodide powder is heated, the vapor rises, and as it settles on the substrate, it is condensed to form the crystalline screen structure. In order to protect the substrate structures from the heat of the source, a thermal-radiation shield 23 having a central aperture 24 formed therein is placed over the source as shown.

Located directly over the source 21 is a planetary fixture hub assembly, which, together with the substrate holders 26 located laterally from the source, act to hold and to move the individual substrates in predetermined positions. The substrates 27, which are formed of a metal material as will be more fully described hereinafter, are positioned in the planetary fixture assembly as shown such that they are offset from the central axis along which the phosphor vapor tends to flow. A number of substrates as, for example three or four, can be located around the central axis in this manner. The planetary fixture apparatus then acts to cause the substrates to revolve around a central axis and at the same time to rotate on an individual substrate axis to thereby present a constantly-moving edge to that area near the central axis where the vapor tends to form and be deposited. Thus, it will be seen that, rather than the vapor being directed to the central portion of the substrate as in conventional systems, it will be directed to the edge portions of the substrates, in an evenly-distributed manner, to thereby result in a deposited layer having a greater thickness at the edges than at the central portion of a substrate. To say this in another way, where the phosphor vapor is caused to flow upwardly to be condensed and formed on a substrate which is placed relatively close to the source, the vapor tends to flow in a generally cosine distribution form. With the apparatus as shown and described hereinabove, the distribution is still of a cosine nature, but, because of the relative positioning of the substrates with respect to the source, and because of the revolving and rotating movement of the substrates, the vapor will tend to flow more heavily on the edges of the substrate and will be therefore built up in such a way that the edges are thicker than the central portions. This structure is of course preferred for reasons as discussed hereinabove.

Figure 3:
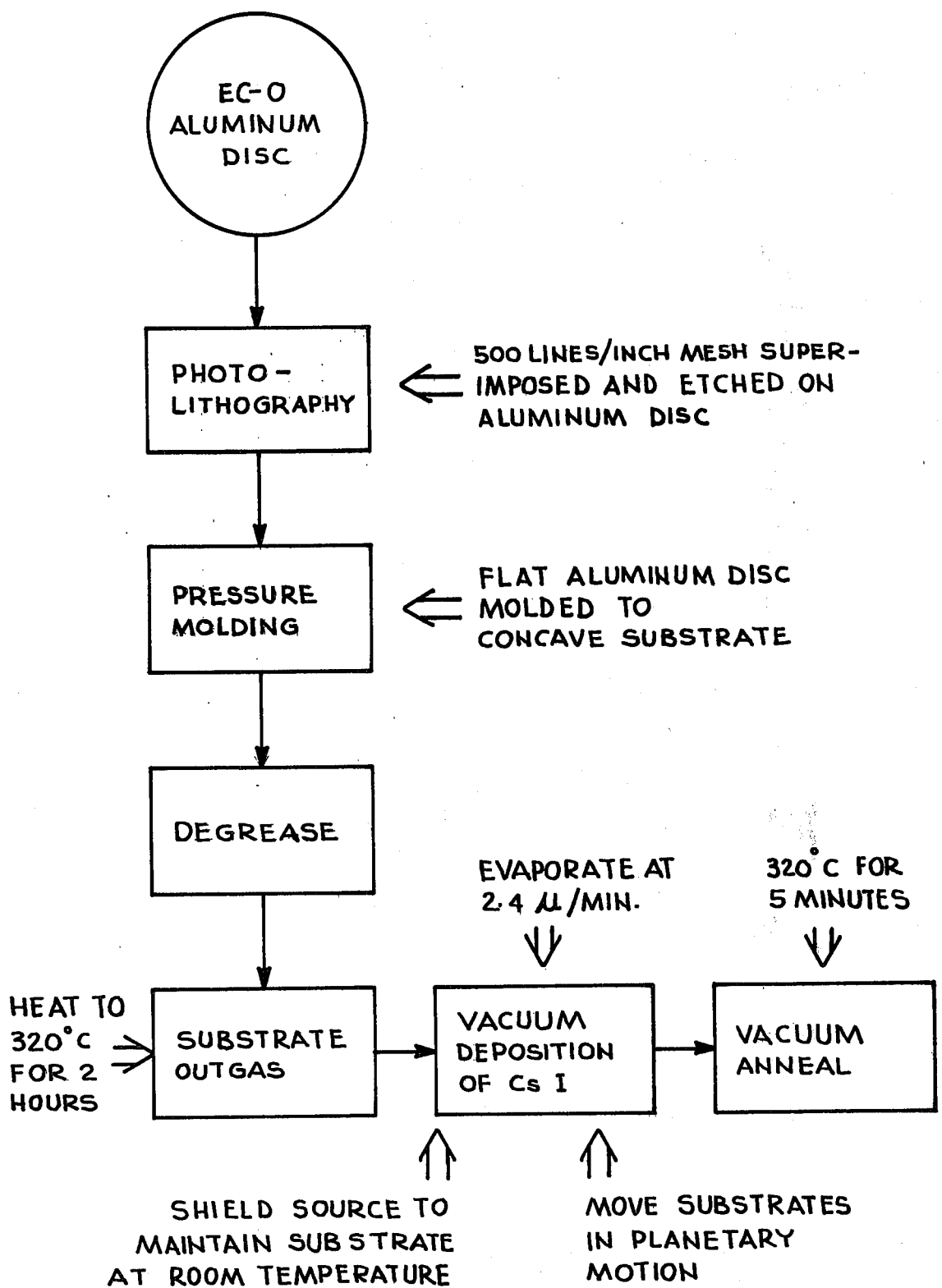
FIG. 3 is a schematic illustration showing the process for the fabrication of a scintillator screen in accordance with the present invention.

The process of forming this scintillator screen will now be described with reference to the process flow chart of FIG. 3. The substrate material can be chosen from any of a number of well-known metal or glass materials which are suitable for this purpose. A preferred material is a type EC-O aluminum. The aluminum disc, having a diameter up to 10 inches, is photo-etched by lithography techniques or the like to transpose a mesh on its surface. The resultant array pattern on the aluminum substrate exhibits land areas fixed to 10 microns wide with depressed areas substantially square in shape and being roughly 5 microns deep. The photo-etched aluminum disc is then subjected to pressure molding in order to make it concave in shape. The substrate is then degreased and prepared to receive the evaporated cesium iodide layer.

A number of the substrates are then placed in the appropriate positions on the driving hub of a modified planetary fixture as described hereinabove. The evaporation source is placed directly at the center of the hub approximately $7\frac{1}{2}$ inches away from the center of each substrate. The source is then surrounded by a thermal-radiation shield as shown in FIG. 2. The function of the thermal-radiation shield 23 is to maintain the substrate temperature below 65° C. throughout the cesium iodide deposition cycle. Because of the so-called "hidden source" arrangement, the only exposed area of the source that can influence the substrate temperature is the aperture 24 through which the cesium iodide vapor will evolve.

The vacuum system is now actuated, and the space within the bell jar 19 is evacuated to a pressure of approximately $5 \times 10^{-6}$ torr. The substrates are then outgassed by exposing them to a temperature of 320° C. for two hours to thereby rid the substrate surface of any contaminants, such as monolayers of water, organics, and so forth, which may come in intimate contact with the condensing cesium iodide vapor. After the substrates have been outgassed, they are allowed to cool down to room temperature while the vacuum system is still operating.

While maintaining a vacuum of $2 \times 10^{-6}$ torr or better, and while maintaining the temperature of the substrate at substantially room temperature, the deposition process is commenced. The initial current is applied to this source 21 at a very slow rate in order to maintain the integrity of the chamber pressures. This is necessary because, as the source heats up, trapped gasses in the polycrystalline cesium iodide phosphor powder tend to evolve and cause chamber pressure to increase. Preferably, the total time involved in the ramping of the source temperature up to 640° C. and purging the phosphor of trapped gasses amounts to approximately 30 minutes. Throughout the entire source-purging operation, the substrates are moving in a planetary motion, that is, revolving on the axis with respect to the source and rotating on the axes with respect to their centers. As the cesium iodide vapor evolves, the source temperature is continuously maintained at 640° C. and the system pressure is not allowed to exceed $5 \times 10^{-6}$ torr during the phosphor deposition. When operating within these parameters, the evaporation and subsequent deposition occurs at a relatively slow rate such that the growth of the layer does not exceed 3 microns per minute. This relatively slow deposition rate, when used with the planetary system as described hereinabove, allows for a deposition of a single layer having a thickness in the range of 5 to 15 mils, while still maintaining the columnar structure which is desired for the abatement of lateral light flow.

Because of the close proximity of a hidden source to the substrates, and because of the geometric positioning of the substrates within the planetary system, the bulk of the evaporated cesium iodide is directed towards the edges of the substrate. As a result, the edges of an evaporated screen will be thicker than the center of the screen. For example, a screen having a 10 mils center thickness will have an edge thickness between 12 and 13 mils. This contouring effect is desirable for X-ray image intensifiers because it tends to offset the loss of image brightness which occurs at the edge of conventional screens due to the nature of all tube electron-optic designs. This brightness-loss phenomena is especially critical in larger-diameter tubes, such as those being addressed in the present case.

It will be recognized that as contrasted from the conventional procedure of alternately depositing and annealing several layers, the present practice employs only a single deposition step to form a single layer having a substantial thickness. Hence, it is necessary to have a source with a substantial capacity that is one which will hold up to a kilogram of cesium iodide. Further, because of the planetary arrangement, wherein a plurality of substrates are simultaneously exposed to the evaporated cesium iodide, the heat capacity requirement is substantially increased from that of conventional systems.

After the source has depleted itself of phosphor powder, the deposition process is complete and the annealing process is begun. During this time period, the screens, while remaining in the vacuum, are exposed to 320° C. temperatures for a period of 5 to 15 minutes. The purpose of this step is to induce cracking in the input screen which results from the thermal stressing caused by the differences in rates of thermal expansion and contraction for the cesium iodide covering the land areas of the substrate as compared with that of the cesium iodide covering the depressed areas of the substrate. In this way, the annealing process acts as a thermal-shocking medium. Cracks tend to propagate at right angles to one another, following the mosaic array of the photoetched meshed pattern. The extent of propagation of these cracks is controlled by the land width and etch depth of the photoetched substrate and by the desired screen thickness. Crack frequency for cesium iodide evaporated on photoetched substrates and conventional substrates is also strongly dependent on the differences in the coefficients of thermal expansion of the substrate material and of the cesium iodide.

Because of the very brief period of time that the screens are exposed to the anneal cycle, minimal recrystallization within the cesium iodide screen occurs such that the integrity of the individual cesium iodide fibers is maintained between the substrate/screen interface to the screen surface. In this way, fusion of the cesium iodide columnar fibers is inhibited while at the same time providing for the thermal shocking and cracking function while is desirable for the proper light-flow characteristics.

Figure 4:
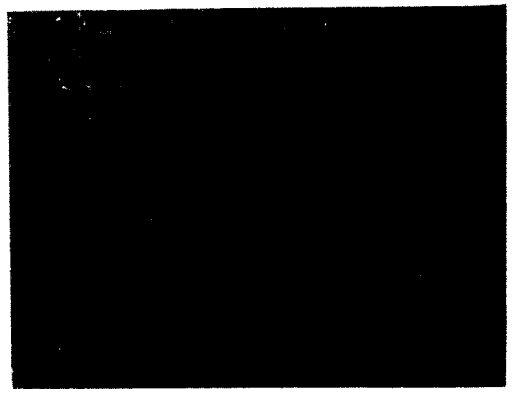
FIGS. 4A and 4B are photographic views of a conventional cesium-iodide scintillator screen in accordance with the prior art.
Figure 4:
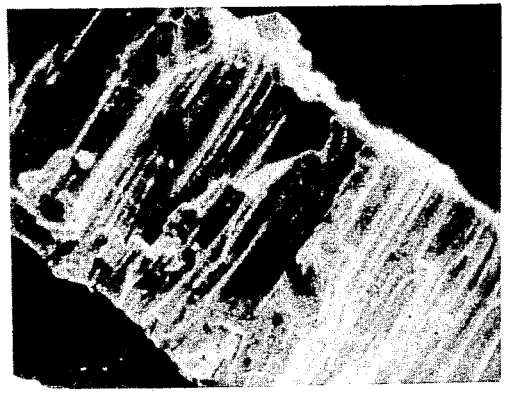
Figure 5:
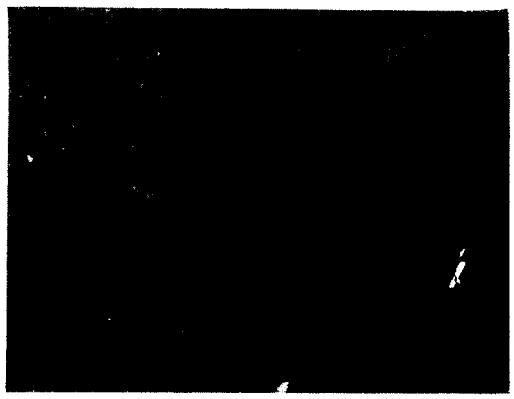
FIGS. 5A and 5B are photographic views of the microstructure of a cesium-iodide scintillator screen made in accordance with the present invention.
Figure 5:
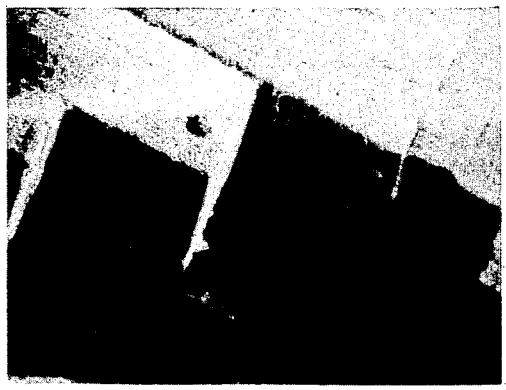

The structure of the scintillator screen formed in the manner described hereinabove will be seen in FIG. 5 and can be easily distinguished over the structure resulting from the conventional process as shown in FIG. 4. In FIG. 4A, there is illustrated a microscopic photo of the surface of a cesium iodide screen which has been made using conventional techniques. As will be seen, the cracks are formed in a random manner and are relatively low in number. FIG. 4B shows the associated cross-sectional view of the cesium iodide screen formed by such a conventional technique. It will be recognized that, although there are some structural elements which are extending generally in a longitudinal direction through the screen to provide for the flow of light in that direction, the structure is relatively random in structural size, shape, and alignment, such that, as light is generated within the structure, it will tend to be scattered laterally rather than to flow in a direction perpendicular to the substrate as is desired.

It will be seen by reference to FIG. 5A that the surface of a structured cesium iodide screen evaporated on an aluminum substrate as described hereinabove produces regular crack patterns with controlled dimensions and much greater density than that of the screen shown in FIG. 4A. Because these cracks tend to propagate in a direction perpendicular to the substrate when prepared in the manner described hereinabove, the resulting cross section of a structured cesium iodide screen evaporated on an aluminum substrate in the inventive manner described hereinabove will appear as shown in FIG. 5B. It will be recognized that the columnar fibers extend in a generally perpendicular direction with respect to the substrate and are continuous throughout the dimensions of the layer such that lateral scattering of generated light is suppppressed and the flow of light from the input screen to the photocathode is enhanced. It has been found that a cesium iodide scintillator screen made in a single layer to a thickness of 12 mils by use of the techniques described hereinabove will result in an input screen having a quantum-detection efficiency in the range of 75 to 80 percent. This should be compared with other known methods of multilayer screen preparation wherein the quantum-detection efficiency is in the range of 45 to 60 percent.

Although the present invention has been described in terms of a preferred embodiment, it will be recognized that the particular process may be varied to obtain similar results while remaining within the scope of the invention. Further, it should be mentioned that, although the invention has been described in terms of an image intersifier tube, it is not the intention to limit the invention to such a screen. Thus, whereas the exemplary structural embodiment and in particular method of manufacture are both merely exemplary rather than definitive of the bounds of the invention, the specific novelty and scope of the invention is defined in the claims appended hereto.

What is claimed is:

1. An improved method of depositing a phosphor material on a substrate to produce an image screen for receiving radiation and responsively emitting light comprising the steps of:

(a) providing a planetary rotation apparatus on the central axis of and within the confines of a vacuum evaporator;
   (b) attaching at least one substrate to the rotation apparatus such that the substrate is radially displaced from the central axis of an evaporator; and
   (c) evaporating phosphor while the substrate is rotated to thereby obtain an image screen having a thickness greater at its edge than at its center.

2. An improved method as set forth in claim 1 wherein said at least one substrate is relatively close to the source of said evaporator, such that the deposition of phosphor occurs in a generally cosined distribution manner.

3. An improved method as set forth in claim 2 wherein the distribution between said substrates and said source is in the range of 25 to 35 inches.

4. An improved method as set forth in claim 1 wherein said at least one substrate has a diameter of greater than 1 inch.

5. An improved method as set forth in claim 1 wherein said phosphor is evaporated at a rate such that the resulting screen is deposited at a rate not exceeding 3 microns per minute.

6. An improved method as set forth in claim 1 wherein a single deposition is made to produce a screen having a thickness greater than 6 mils.

7. An improved method as set forth in claim 1 wherein said evaporator has included a hidden source to protect the at least one substrate from the heat of the source.

8. An improved method as set forth in claim 7 wherein the substrate is maintained at a temperature not to exceed 65° C.

9. An improved method as set forth in claim 1 wherein said substrate is made to a concave form.

10. An improved method as set forth in claim 1 wherein at the commencement of the deposition process, the source temperature is brought up slowly to the ultimate temperature over a period of at least 25 minutes.

11. An improved process for vacuum depositing a phosphor material on a substrate to produce a scintillator screen wherein the improved process includes the step of depositing the phosphor at a rate not exceeding 3 microns per minute to form a high-resolution scintillator screen which is substantially comprised of columnar fibers extending substantially perpendicularly from the substrate.

12. An improved process as set forth in claim 11 wherein the method of depositing results in a single-deposition layer having a thickness greater than 6 mils.

13. An improved process as set forth in claim 11 wherein the deposition is made while the substrate is held to a temperature not exceeding 70° C.

14. An improved process as set forth in claim 13 wherein the substrate is held to a low temperature by the use of a shield placed between the source and the substrate.

15. An improved process as set forth in claim 11 wherein the deposition is made while the substrate is being rotated about its center and revolved about the center of axis of the evaporation source.

16. An improved process as set forth in claim 11 wherein said substrate is greater than 1 inch in diameter.

17. An improved process as set forth in claim 11 wherein the deposition is made in such a manner so as to form a screen having a greater thickness on its edge than at its center.

18. An improved process as set forth in claim 11 and including the additional step of annealing the screen.

19. An improved process as set forth in claim 18 wherein the annealing process is conducted over a time period of less than 30 minutes.

20. An improved process as set forth in claim 11 wherein said substrate is concave in form.

21. An improved process as set forth in claim 11 wherein said substrate is formed in a matrix of non-linearity thickness prior to the deposition process.

22. An improved process for vacuum depositing of phosphor material on a substrate to produce a scintillator screen wherein the improvement comprising the step of depositing the phosphor material in a single, uninterrupted process to form a layer which is greater than 6 mils in thickness and which is substantially comprised of columnar fibers extending substantially perpendicularly from the substrate.

23. An improved process as set forth in claim 22 and including the step of maintaining the substrate at a temperature below 70° C. during the deposition process.

24. An improved process as set forth in claim 22 and including the step of forming a matrix structure in said substrate prior to the deposition process.

25. An improved process as set forth in claim 22 wherein said phosphor material is deposited at a rate not exceeding 3 microns per minute.

26. An improved process as set forth in claim 22 and including the additional step of annealing the screen after the deposition process is complete.

27. An improved process as set forth in claim 26 wherein said annealing process is accomplished within a time period of less than 30 minutes.

28. An improved process as set forth in claim 22 wherein during the deposition process the substrate is offset from the direct line of vapor from the source.

29. An improved process as set forth in claim 28 and including the step of rotating the substrate during the deposition process.

30. An improved process as set forth in claim 22 and including the step of placing a barrier between the source of the phosphor material and the substrate on which it is to be deposited.

31. An improved method of making a scintillator screen by the deposition of a single phosphor layer to a thickness of greater than 6 mils on a substrate, wherein the improvement comprises the step of annealing the deposited layer to substantially eliminate the existence of electron traps within its structure, said annealing process being conducted for a time period of less than 30 minutes.

32. An improved method as set forth in claim 31 wherein said annealing process is conducted in a vacuum.

33. An improved method as set forth in claim 31 wherein said annealing process is conducted at a temperature at a range of 300° C. to 350° C.

34. An improved method as set forth in claim 31 wherein the substrate is structured to cause the formation of fibrous structure within the phosphor layer, with a fibrous structure extending substantially perpendicularly to the substrate.

35. An improved method as set forth in claim 31 wherein the phosphor layer is applied at a rate of less than 3 microns per minute.

36. An improved method as set forth in claim 31 wherein said substrate is concave in form.

37. An improved method as set forth in claim 31 wherein said substrate is maintained at a temperature of less than 70° C. during the deposition process.

* * * * *